(12) United States Patent
Asai (10) Patent No.: US 8,284,429 B2
(45) Date of Patent: Oct. 9, 2012

(54) FACSIMILE MACHINE INCLUDING A TRANSMISSION INHIBITION UNIT WHICH INHIBITS AND RELEASE A TRANSMISSION OPERATION

(75) Inventor: Norihiko Asai, Tajimi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 842 days.

(21) Appl. No.: 12/366,852

(22) Filed: Feb. 6, 2009

(65) Prior Publication Data
US 2009/0201549 A1   Aug. 13, 2009

(30) Foreign Application Priority Data

Feb. 8, 2008   (JP) ................................. 2008-029079

(51) Int. Cl.
G06F 3/12    (2006.01)
G06K 15/00   (2006.01)
G06K 9/36    (2006.01)
G06K 9/32    (2006.01)
H04N 1/00    (2006.01)
H04N 1/04    (2006.01)

(52) U.S. Cl. ...... 358/1.15; 358/1.18; 358/405; 358/498; 382/289; 382/291; 382/295; 382/296

(58) Field of Classification Search .................. 358/1.15, 358/1.18, 505, 508, 514, 448, 474, 488, 496, 358/498, 405; 379/1.03, 1.04, 28; 382/321, 382/315, 318, 319, 317, 287, 289, 291, 295, 382/296

See application file for complete search history.

(56) References Cited

U.S. PATENT DOCUMENTS

| | | | | |
|---|---|---|---|---|
| 5,513,017 | A | * | 4/1996 | Knodt et al. .................. 358/471 |
| 5,534,973 | A | | 7/1996 | Haranda |
| 2007/0216968 | A1 | | 9/2007 | Enomoto |

FOREIGN PATENT DOCUMENTS

| | | |
|---|---|---|
| JP | 63-172571 | 7/1988 |
| JP | 06-276350 | 9/1994 |
| JP | 08-079478 | 3/1996 |
| JP | 10-093744 | 4/1998 |

(Continued)

OTHER PUBLICATIONS

Kenji et al., Facsimile Equipment, Oct. 18, 2002, Machine Translation Japanese Patent Application Publication, JP2002305626, all pages.*

(Continued)

Primary Examiner — Benny Q Tieu
Assistant Examiner — Ngon Nguyen
(74) Attorney, Agent, or Firm — Banner & Witcoff, Ltd.

(57) ABSTRACT

A facsimile machine is provided. The facsimile machine includes a first reading unit which reads an image of an original placed on a platen; a second reading unit which reads an image of an original while feeding the original; a transmitting unit which is configured to execute a first transmission operation to transmit the image of the original read by the first reading unit as facsimile data and a second transmission operation to transmit the image of the original read by the second reading unit as facsimile data; a transmission inhibition unit which inhibits the first transmission operation by the transmitting unit; and a release unit which releases the inhibition of the first transmission operation by the transmission inhibition unit.

4 Claims, 7 Drawing Sheets

FOREIGN PATENT DOCUMENTS

| | | |
|---|---|---|
| JP | 11-308390 | 11/1999 |
| JP | 2000-059548 | 2/2000 |
| JP | 2002-305626 A | 10/2002 |
| JP | 2004-134899 | 4/2004 |
| JP | 2007-027817 A | 2/2007 |
| JP | 2007-104479 A | 4/2007 |
| JP | 2007-251781 | 9/2007 |

OTHER PUBLICATIONS

JP Office Action dtd Feb. 2, 2010, JP Appln. 2008-029079, English translation.

* cited by examiner

PLEASE SET ORIGINAL ON ADF. TRANSMISSION FROM ADF WILL BE START.

FIG. 8B

NO ORIGINAL IS SET ON ADF. FOR TRANSMISSION FROM FLATBED, PLEASE OPEN COVER AND SET ORIGINAL. NEXT, PLEASE CLOSE COVER AND PRESS TRANSMISSION BUTTON. FOR TRANSMISSION FROM ADF, PLEASE SET ORIGINAL. TRANSMISSION FROM ADF WILL BE START.

FIG. 8C

DO YOU WANT TRANSMISSION FROM FLATBED?
1: YES        2: NO

FIG. 8D

PLEASE SET ORIGINAL ON FLATBED AND PRESS TRANSMISSION BUTTON.

FIG. 9

PLEASE SET ORIGINAL AND SELECT SOURCE.
1: FLATBED        2: ADF

FACSIMILE MACHINE INCLUDING A TRANSMISSION INHIBITION UNIT WHICH INHIBITS AND RELEASE A TRANSMISSION OPERATION

CROSS-REFERENCE TO RELATED APPLICATION

This application claims priority from Japanese Patent Application No. 2008-029079, filed on Feb. 8, 2008, the entire subject matter of which is incorporated herein by reference.

TECHNICAL FIELD

Aspects of the present invention relate to a facsimile machine that transmits an image read from an original as facsimile data, and in particular, to a facsimile machine that is capable of executing an operation to read and transmit an image of an original placed on a platen and an operation to read and transmit an image of an original while automatically feeding the original.

BACKGROUND

A facsimile machine executes an operation to read an image of an original placed on a platen in a so-called flatbed manner and to transmit the read image as facsimile data, and an operation to read an image of an original while automatically feeding the original by an automatic document feeding device, such as an Automatic Document Feeder (ADF) and to transmit the read image as facsimile data. Such a facsimile machine is configured to automatically execute the former operation when an original is set only on the platen and to automatically execute the latter operation when an original is set only in the automatic document feeding device (for example, see JP-A-2004-134899).

In many cases, the platen is provided with a cover, and a user may be unaware that an original is mislaid on the platen. For this reason, in a facsimile machine that is capable of executing the above-described two transmission operations, when an original is mislaid on the platen, the following erroneous transmission operation may occur. If a user who wants to perform transmission using the automatic document feeding device is distracted by talk of somebody or the like when the user sets the original and presses a start key while thinking that the original is normally set on the automatic document feeding device, data of the original mislaid on the platen may be erroneously transmitted. Similarly, if the user erroneously sets the original in the automatic document feeding device and if the facsimile machine determines that no original is set in the automatic document feeding device, erroneous transmission may occur.

In a case where a sensor for detecting whether an original is placed on the platen is not provided, even if an original is mislaid on the platen, the above erroneous operation may be executed. When this happens, since no original is set in the automatic document feeding device, an operation to read an original placed on the platen may be executed. In this case, facsimile data corresponding to a blank page is transmitted.

SUMMARY

Exemplary embodiments of the present invention address the above disadvantages and other disadvantages not described above. However, the present invention is not required to overcome the disadvantages described above, and thus, an exemplary embodiment of the present invention may not overcome any of the problems described above.

Accordingly, it is an aspect of the present invention to suppress erroneous transmission in a facsimile machine which is capable to executing an operation to read and transmit an image of an original placed on a platen and an operation to read and transmit an image of an original while automatically feeding the original.

According to an exemplary embodiment of the present invention, there is provided a facsimile machine including: a first reading unit which reads an image of an original placed on a platen; a second reading unit which reads an image of an original while feeding the original; a transmitting unit which is configured to execute a first transmission operation to transmit the image of the original read by the first reading unit as facsimile data and a second transmission operation to transmit the image of the original read by the second reading unit as facsimile data; a transmission inhibition unit which inhibits the first transmission operation by the transmitting unit; and a release unit which releases the inhibition of the first transmission operation by the transmission inhibition unit.

According to another exemplary embodiment of the present invention, there is provided an image reading device including: a first reading unit which executes a first reading operation to read an image of an original placed on a platen; a second reading unit which executes a second reading operation to feed an original from a placing portion, on which the original is placed, and to read the original while being fed; a detection sensor which detects whether the original is placed on the placing portion; a mode selecting unit which selects an operation mode from among a plurality of operation modes including a first operation mode and a second operation mode; and a controller which, in response to an input of a first signal, controls the second reading unit to execute the second reading operation if the first operation mode is selected by the mode selecting unit and if the detection sensor detects that the original is placed on the placing portion, and controls the first reading unit and the second reading unit not to execute the first or second reading operation if the first operation mode is selected by the mode selecting unit and if the detection sensor detects that the original is not placed on the placing portion.

According to another exemplary embodiment of the present invention, there is provided a first reading unit which executes a first reading operation to read an original placed on a platen; a second reading unit which executes a second reading operation to read an original while feeding the original; a facsimile transmission section which is configured to transmit the read image; an operation section which receives a first operation; and a controller which, in response to the first operation, controls the facsimile transmission section not to transmit the image if the image is read by the first reading unit and controls the facsimile transmission section to transmit the image if the image is read by the second reading unit.

BRIEF DESCRIPTION OF THE DRAWINGS

The above and other aspects of the present invention will become more apparent and more readily appreciated from the following description of exemplary embodiments of the present invention taken in conjunction with the attached drawings, in which.

DETAILED DESCRIPTION (Overall Configuration of Multi-Function Machine)

Figure 1:
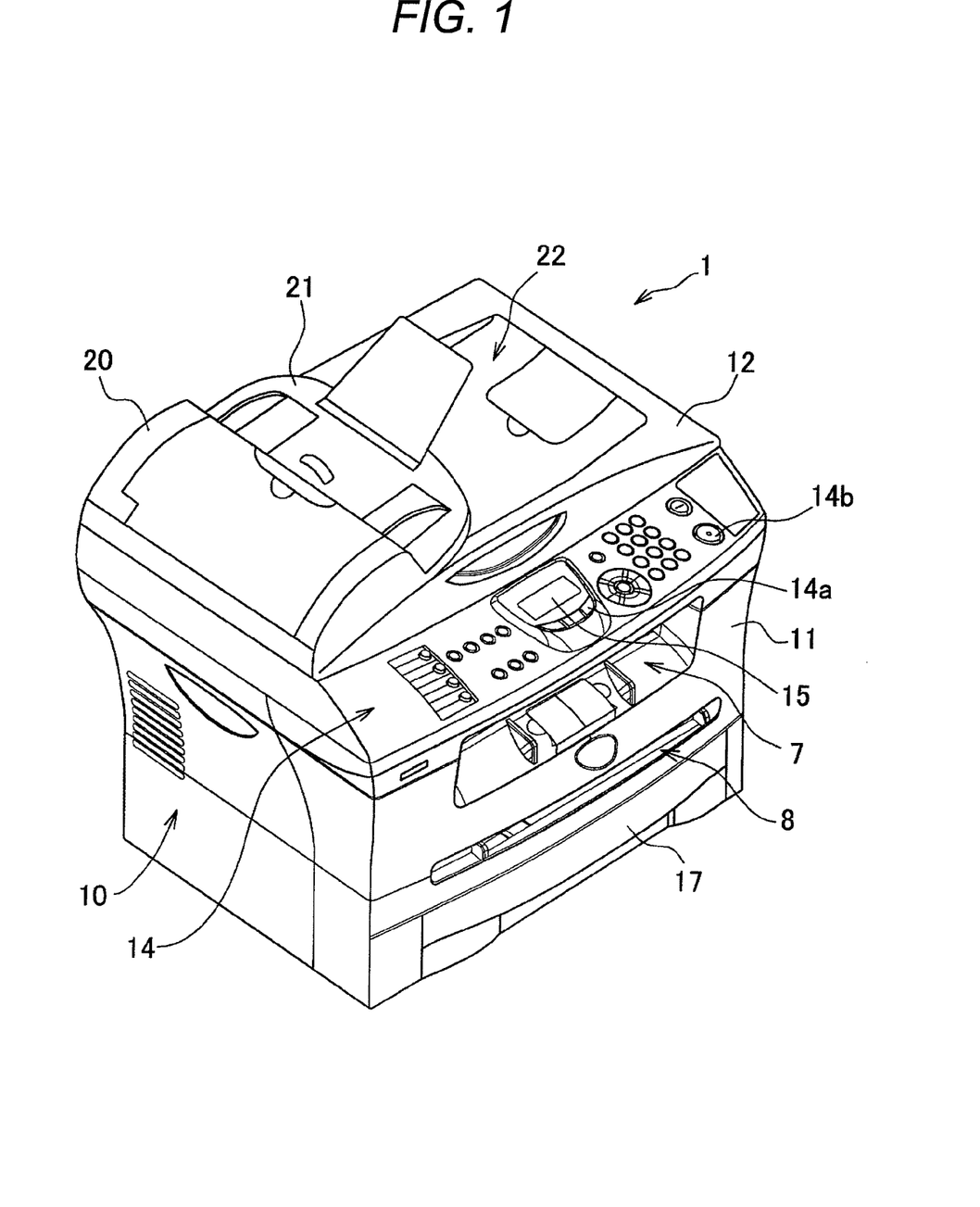
FIG. 1 is a perspective view showing the exterior of a multi-function machine according to an exemplary embodiment.
Figure 2:
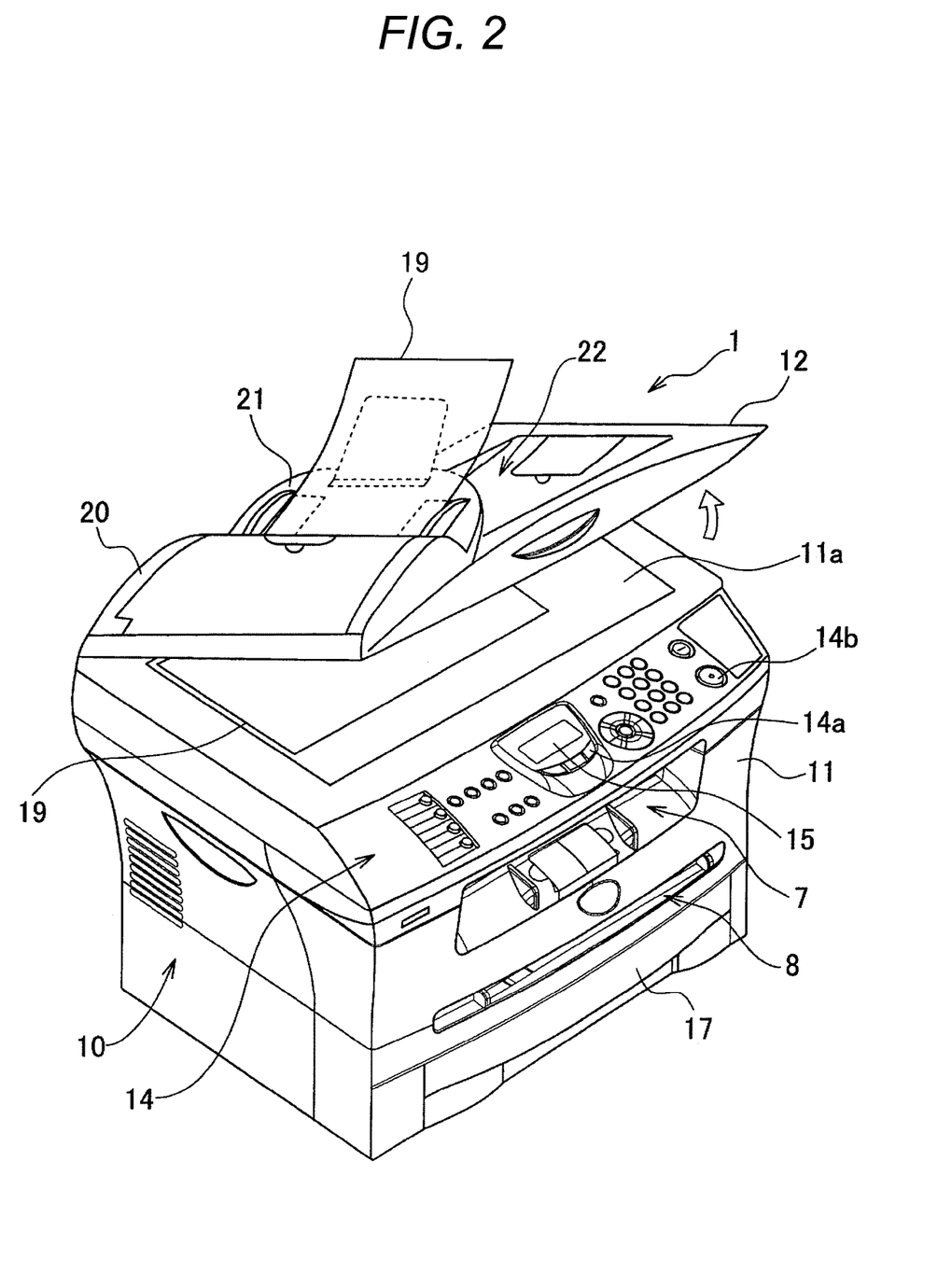
FIG. 2 is a perspective view showing a state in which a main body cover provided in a multi-function machine is open.

An exemplary embodiment of the present invention will now be described with reference to the drawings. FIG. 1 is a perspective view showing the exterior of a multi-function machine 1 according to an exemplary embodiment. FIG. 2 is a perspective view showing a state in which a main body cover 12 provided to the multi-function machine 1 is opened.

As shown in FIGS. 1 and 2, the multi-function machine 1 includes a sheet tray 17 that feeds a sheet (not shown) to be printed, a main body 10 that forms an image, which is obtained by reading information of an original 19 (see FIG. 2), on the sheet fed from the sheet tray 17, and a main body cover 12 that is pivotably supported by the main body 10 so as to open and cover the entire top surface of the main body 10.

The main body 10 includes a document reading section 40 (see FIG. 3) that reads the image of the original 19, an image forming section 50 (see FIG. 3) that forms an image on the sheet, and an operating section 14 through which a user inputs necessary information when the multi-function machine 1 is used. The document reading section 40 is configured by, for example, an image sensor. The image forming section 50 is configured by, for example, a device that forms an image on a sheet by employing an electrophotography method. The document reading section 40 and the image forming section 50 are housed in a main body case 11. The configuration of the document reading section 40 and the image forming section 50 is known (for example, see JP-A-2007-251781), and a detailed description thereof will be omitted herein.

The main body case 11 has a so-called flatbed type platen 11a on which the original 19 to be read by the document reading section 40 is set, a manual sheet feeding section 8 that feeds a sheet to the image forming section 50 not through the sheet tray 17, and a sheet discharge section 7 to which the sheet printed by the image forming section 50 is discharged. The platen 11a is a plate member which is made of a light-transmissive material, such as glass or the like, and is fixed to the top surface of the main body case 11 so as to oppose the main body cover 12. The document reading section 40 is provided at a predetermined position below the platen 11a.

The main body cover 12 has an automatic document feeding device 20 that includes a placing portion 21 on which the original 19 before being read by the document reading section 40 is set, and an accumulating portion 22 on which the original 19 after being read by the document reading section 40 is accumulated. The automatic document feeding device 20 feeds the original 19 from the placing portion 21 to the accumulating portion 22 through the platen 11a so that the document reading section 40 reads the original 19 being fed. Such an automatic document feeding device 20 is known (for example, see JP-A-2007-251781). The automatic document feeding device 20 includes a document detection sensor 23 (see FIG. 3) that detects the original 19 set in the placing portion 21. That is, the multi-function machine 1 is capable of executing an operation to read the image of the original 19 placed on the platen 11a in flatbed manner and an operation to read the image of the original 19 while automatically feeding the original 19 by the automatic document feeding device 20.

The operating section 14 includes an operation selection key 14a for selecting a mode desired by the user from among a plurality of modes, a start key 14b for executing the mode selected by the user, and a display section 15 for displaying the status of the multi-function machine 1 or the like. If the operation section is operated, a signal according to operation is sent to a CPU 106.

The operation selection key 14a is used to select a mode that the user wants to use from among a plurality of modes which the multi-function machine 1 has. Specifically, the operation selection key 14a includes a copy key for selecting a copy mode, a facsimile key for selecting a facsimile mode, and a scanner key for selecting a scanner mode.

If the user operates the operation selection key 14a and selects a mode that the user wants to use, display is changed and functions of keys are set corresponding to the selected mode. Thereby, an operating environment to be provided by the operating section 14 is changed. For example, when the facsimile mode is selected, the start key 14b functions as a transmission key. When the copy mode or scan mode is selected, the start key 14b functions as a copy or scan start key.

(Description of Electrical Configuration)

Figure 3:
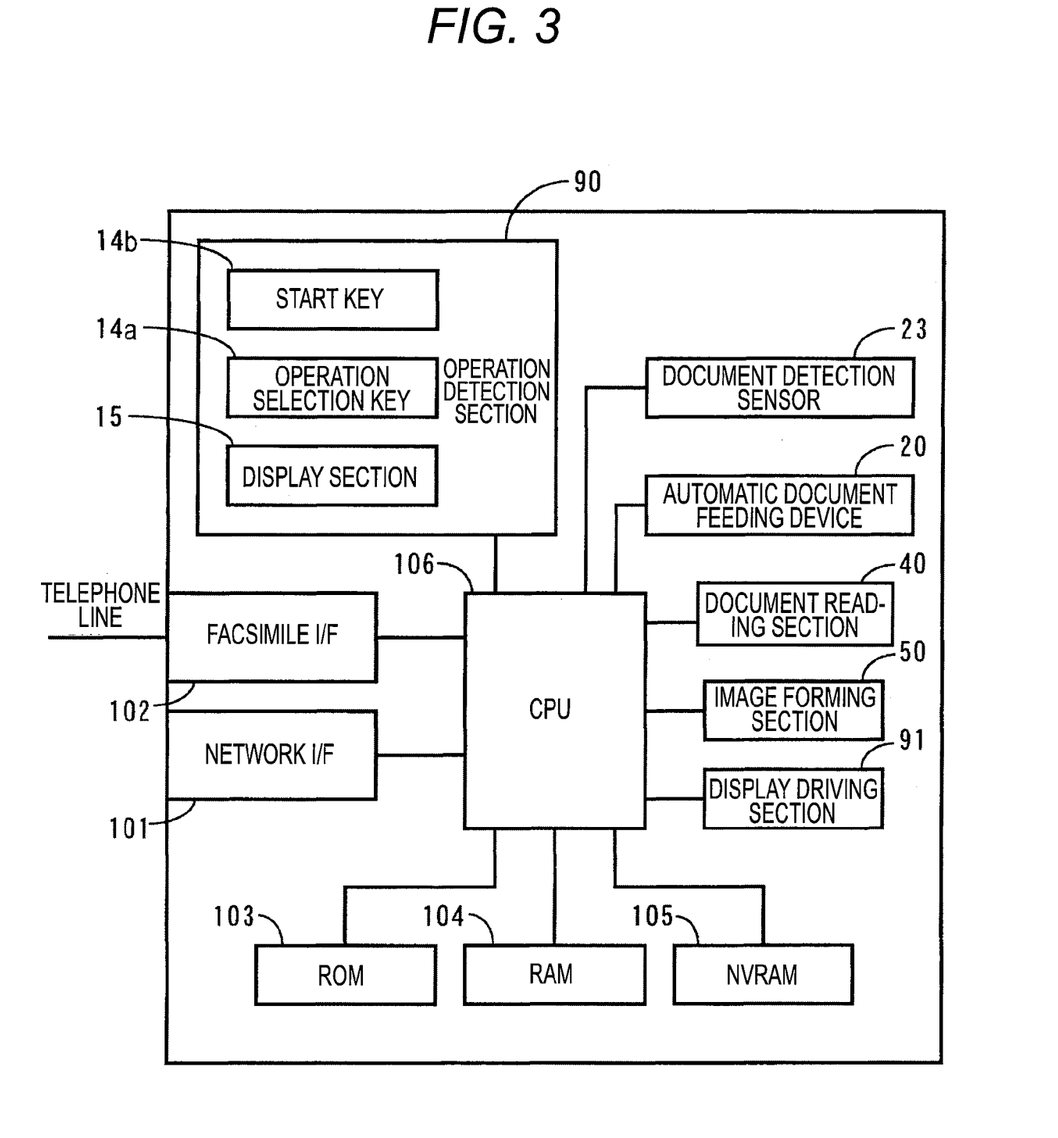
FIG. 3 is a block diagram showing the electrical configuration of the multi-function machine.

FIG. 3 is a block diagram showing the electrical configuration of the multi-function machine 1. As shown in FIG. 3, the multi-function machine 1 includes a network interface (network I/F) 101 for connection to an external apparatus (not shown) such as a personal computer, and a facsimile interface (facsimile I/F) 102 for connection to a telephone line.

The multi-function machine 1 further includes, as a control system for controlling the individual sections, a read only memory (ROM) 103 that stores a processing program for controlling the multi-function machine 1, a random access memory (RAM) 104 that temporarily stores the processing result, a nonvolatile random access memory (NVRAM) 105 that stores data, which needs to be stored even if power is turned off, and a central processing unit (CPU) 106 that executes the processing program stored in the ROM 103.

The CPU 106 is connected to the automatic document feeding device 20, the document detection sensor 23, the document reading section 40, the image forming section 50, the network interface 101, and the facsimile interface 102. The CPU 106 is further connected to a display driving section 91 that controls the display section 15 to display an image, and an operation detection section 90 that detects the operation to the operating section 14.

(Control during Facsimile Transmission and Effect)

A process of transmission to be executed by the CPU 106 on the basis of the processing program stored in the ROM 103 when the facsimile mode is selected will be described. In the following description, an operation to transmit an image read from the original 19 placed on the platen 11a as facsimile data from the facsimile interface 102 is called FB transmission. In addition, an operation to transmit an image, which is read while the automatic document feeding device 20 automatically feeds the original 19, as facsimile data from the facsimile interface 102 is called ADF transmission.

Figure 4:
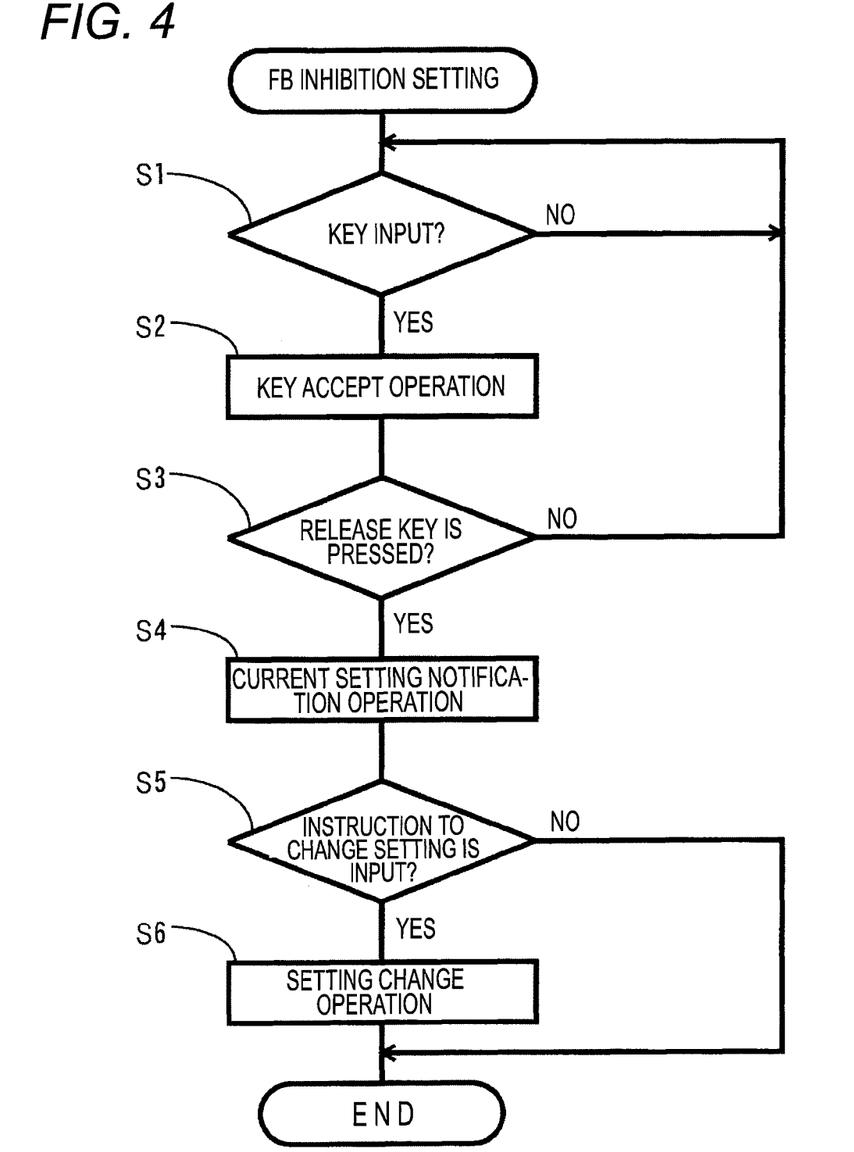
FIG. 4 is a flowchart showing an FB inhibition setting process in a multi-function machine according to an exemplary embodiment of the present invention.

FIG. 4 is a flowchart showing an FB inhibition setting process for setting whether to inhibit FB transmission. This process is executed when a predetermined setting mode is selected by the operation to the operating section 14.

If the process starts, at operation S1, it is determined whether any key input is made to the operating section 14. When no key input is made (S1: No), the process waits at operation S1. If a key input is made (S1: Yes), the process proceeds to operation S2. At operation S2, a key accept operation to accept the key input and store the key input in the RAM 104 is executed. Next, at operation S3, it is determined whether the key input corresponds to the press of a release key. If the key input does not correspond to the press of the release key (S3: No), the process returns to operation S1.

Figure 5:
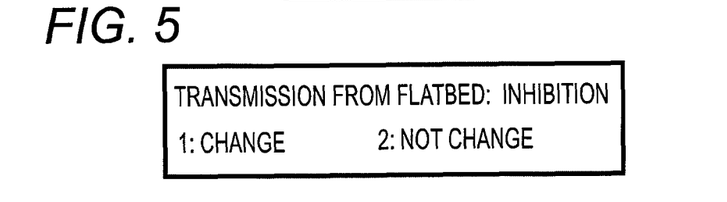
FIG. 5 is an explanatory view showing a display example of a display section during the FB inhibition setting process.

If it is determined that the key input corresponds to the press of the release key (S3: Yes), the process proceeds to operation S4. At operation S4, an operation to indicate the current setting is executed. During this operation, for example, an image shown in FIG. 5 is displayed on the display section 15. In the case of display shown in FIG. 5, a message indicating that transmission from the flatbed, that is, FB transmission is inhibited is displayed. Additionally, an indication is displayed, which prompts an input of a numeral "1" when the setting needs to be changed and prompts an input of a numeral "2" when no change is needed.

Returning to FIG. 4, at operation S5, it is determined whether an instruction to change the setting is input. If the instruction to change the setting is input (S5: Yes), at operation S6, an operation to change the setting is executed, and the process ends. For example, in the example of FIG. 5, when the numeral "1" is input and the setting change is instructed (S5: Yes), the transmission from the flatbed is changed from "inhibition" to "permission" at operation S6. At operation S5, if it is determined that the instruction to change the setting is not input (for example, in the example of FIG. 5, the numeral "2" is input), the process ends as it is. The inhibition or permission of FB transmission set by this operation is stored in the NVRAM 105.

Figure 6:
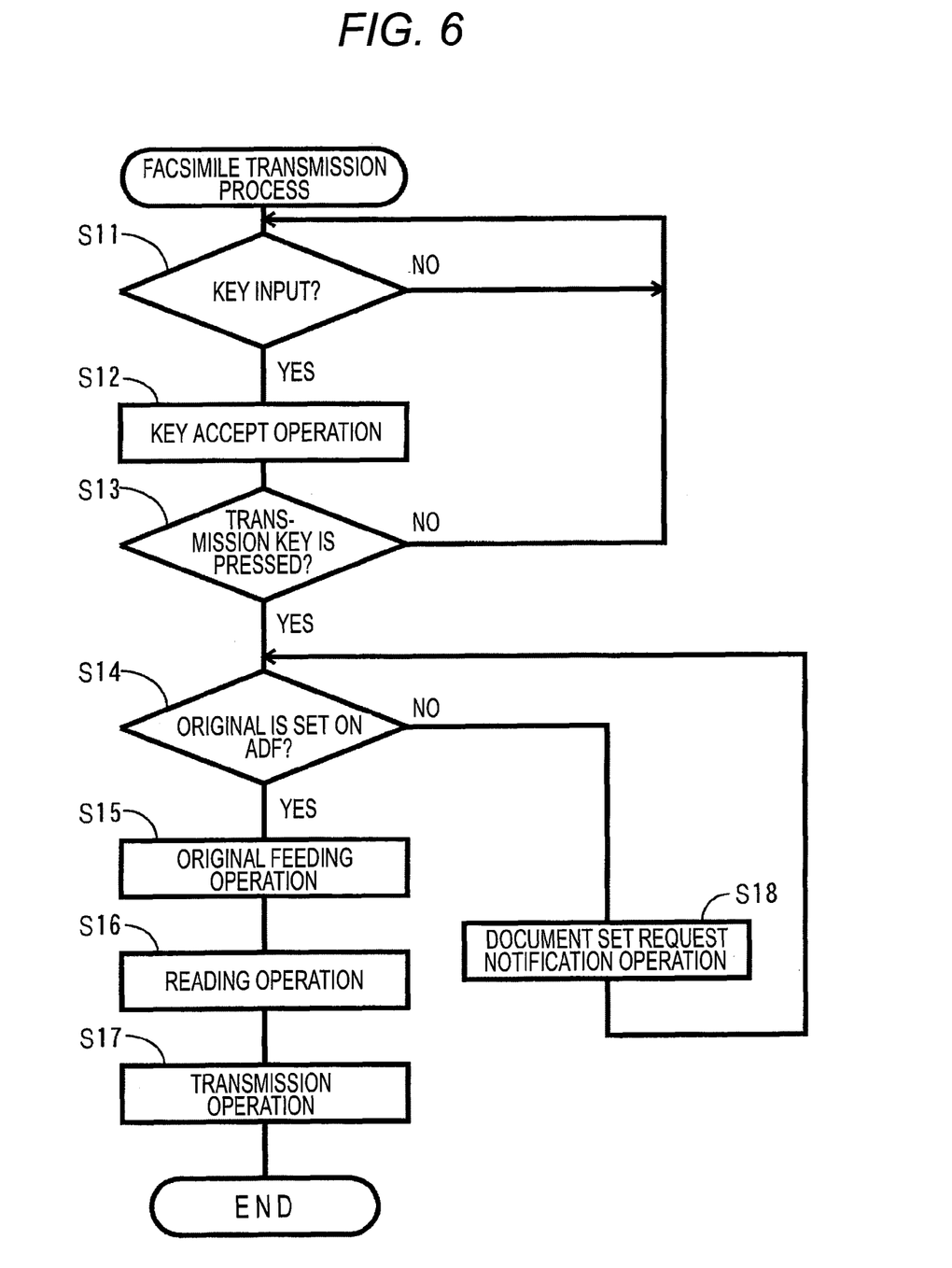
FIG. 6 is a flowchart showing a facsimile transmission process in a multi-function machine when FB transmission is inhibited according to an exemplary embodiment of the present invention.
Figure 7:
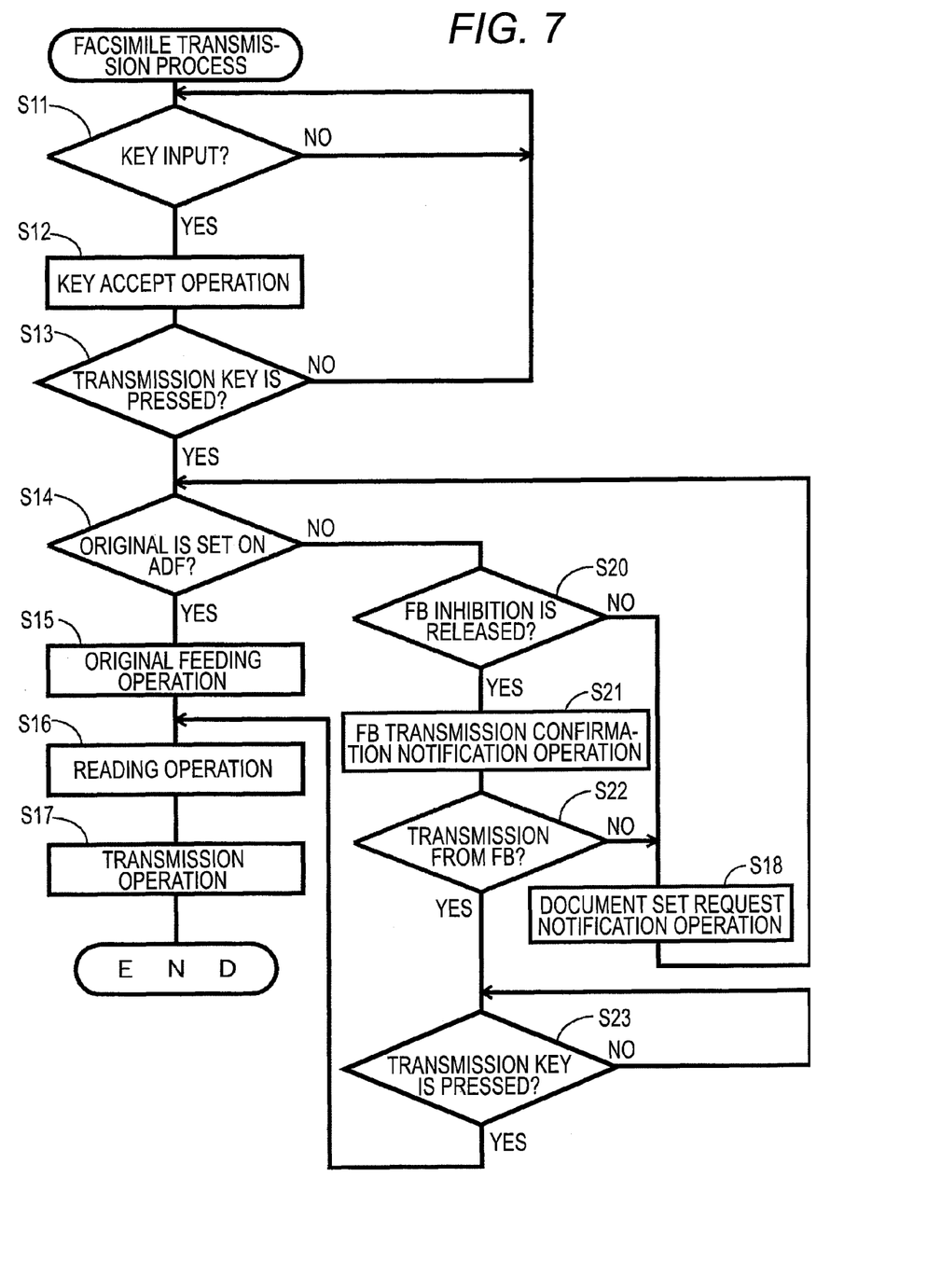
FIG. 7 is a flowchart showing a facsimile transmission process in a multi-function machine when FB transmission is permitted according to an exemplary embodiment of the present invention.

FIG. 6 is a flowchart showing a facsimile transmission process when FB transmission is inhibited. FIG. 7 is a flowchart showing a facsimile transmission process when FB transmission is permitted. First, the process when FB transmission is inhibited will be described.

As shown in FIG. 6, at first, at operation S11, it is determined whether any key input is made to the operating section 14. When no key input is made (S11: No), the process waits at operation S11. If a key input is made (S11: Yes), at operation S12, the key accept operation for the corresponding key input is executed. Next, at operation S13, it is determined whether the key input corresponds to the press of a start key 14b, which corresponds to the transmission key in the facsimile mode. If the key input does not correspond to the press of the transmission key (S13: No), the process returns to operation S11. In this case, as a key input other than the transmission key, an input of the number of copy is conceivable.

If the transmission key is pressed (S13: Yes), at operation S14, it is determined by the document detection sensor 23 whether the original 19 is set on the ADF (that is, the placing portion 21 of the automatic document feeding device 20). If the original 19 is set (S14: Yes), at operation S15, an operation to feed an original by the automatic document feeding device 20 starts, and subsequently, at operation S16, while the original is being fed, an image of the original 19 is read by the document reading section 40. Then, the process proceeds to operation S17. At operation S17, facsimile data corresponding to the read image is transmitted through the facsimile interface 102, and the process ends.

Figure 8A:
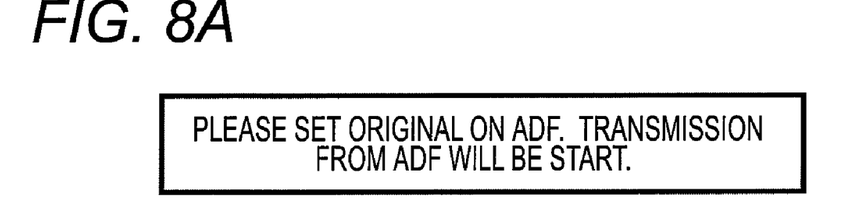
FIGS. 8A to 8D are explanatory views showing display examples of a display section during the facsimile transmission process.

On the other hand, at operation S14, if it is determined that the original 19 is not set on the ADF (S14: No), the process proceeds to operation S18. At operation S18, a document set request notification to display a message shown in FIG. 8A on the display section 15 is executed. Next, the process returns to S14. The message displayed at operation S18 prompts the user to set the original 19 in the placing portion 21 of the automatic document feeding device 20.

As described above, in this exemplary embodiment, when FB transmission is inhibited, facsimile transmission cannot be executed by the automatic document feeding device 20. For this reason, when the original 19 is mislaid on the platen 11a, facsimile data corresponding to the image of the mislaid original 19 can be prevented from being erroneously transmitted. Additionally, when no original is placed on the platen 11a, facsimile data corresponding to a blank page can be prevented from being erroneously transmitted. Furthermore, with respect to such control, neither a sensor for detecting the original 19 on the platen 11a nor a sensor for detecting open/close of the main body cover 12 is provided. Therefore, manufacturing cost for the multifunction machine 1 can be reduced.

It is noted that, even when FB transmission is inhibited, if the copy mode or the scanner mode is selected, an operation to read an image through the platen 11a is executable. That is, in the copy mode or the scanner mode, it is determined by the document detection sensor 23 whether the original 19 is set on the ADF similarly to operation S14. If the original 19 is set, the original is fed by the automatic document feeding device 20, and an image of the original 19 is read by the document reading section 40. Alternatively, if the original 19 is not set, the document reading section 40 is moved along the platen 11a, and the image of the original 19 is read in the flatbed manner. After the image of the original 19, the read image is printed by the image forming section 50 or transmitted to an external device such as a personal computer.

Next, the process when FB transmission is permitted will be described with reference to FIG. 7. This process is different from the process of FIG. 6 in that, when the original 19 is not set on the ADF (S14: No), a different operation is executed, and others are similar. Accordingly, only a difference will be described.

At operation S14, if it is determined that the original 19 is not set on the ADF (S14: No), the process proceeds to operation S20. At operation S20, it is determined with reference to the NVRAM 105 whether the FB transmission is inhibited by FB inhibition setting process.

Figure 8B:
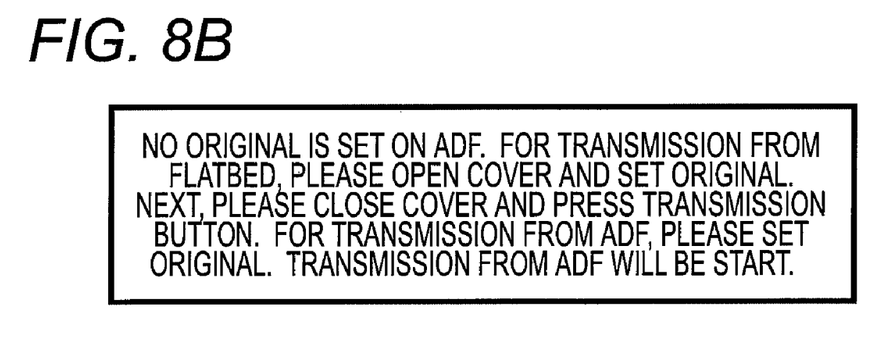

If the FB transmission is permitted, that is, the inhibition of the FB transmission is released (S20: Yes), the process proceeds to operation S21. At operation S21, for example, as shown in FIG. 8B, an operation to notify that FB transmission will be executed is executed by displaying on the display section 15 a message indicating that the image of the original 19 to be transmitted is read through the flatbed, that is, the platen 11a.

Figure 8C:
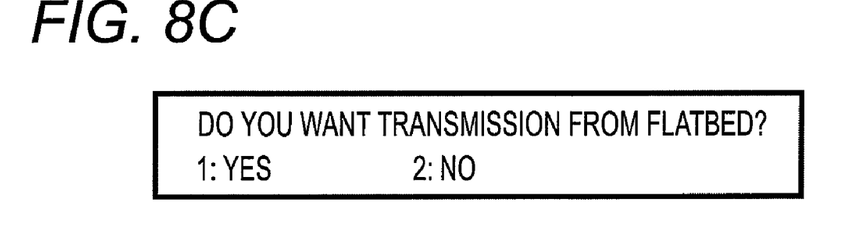
Figure 8D:
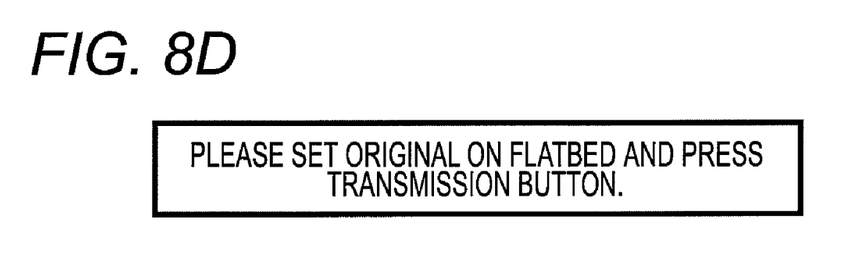

Next, at operation S22, for example, as shown in FIG. 8C, a message for confirming the user's selection on whether to execute FB transmission is displayed on the display section 15. For example, a message "Do you want transmission from flatbed?" is displayed on the display section 15. Based on the operation to the operating section 14 in response to the message, it is determined whether to execute FB transmission. In the example of FIG. 8C, if the numeral "1" is input in response to the message and "YES" is instructed, at operation S22, it is determined to be "Yes". If the numeral "2" is input and "NO" is instructed, at operation S22, it is determined to be "No"

If the FB transmission is to be executed (S22: Yes), at operation S23, the process waits until the transmission key is pressed (S23: No). If the transmission key is pressed (S23: Yes), the process proceeds to operation S16. In this case, at operation S16, the document reading section 40 is moved along the platen 11a, and the image of the original 19 is read in the flatbed manner, and at operation S17, facsimile data corresponding to the image is transmitted.

At operation S22, if it is determined that the FB transmission is not to be executed (S22: No), the process proceeds to operation S18. At the operation S18, the document set request notification operation is executed. Next, the process proceeds to S14. At operation S20, if it is determined that the FB transmission is inhibited, that is, the inhibition of the FB transmission is not released (S20: No), similarly, the process proceeds to S18. With this operation, even if the facsimile transmission process of FIG. 7 is executed due to any reason in a state where FB transmission is inhibited by the above FB inhibition setting operation, FB transmission can be prevented from being performed.

As described above, according to this process similarly to the process of FIG. 6, facsimile data corresponding to the original 19 mislaid on the platen 11a can be prevented from being erroneously transmitted and facsimile data corresponding to a blank page can be prevented from being erroneously transmitted when no original is placed on the platen 11a. In addition, if it is determined the inhibition of FB transmission is released (S22: Yes), facsimile data corresponding to the original 19 placed on the platen 11a can be transmitted. For this reason, a heavy original 19, such as a book or the like, placed on the platen 11a is easily transmitted as facsimile data. Furthermore, the release operation is executed for each transmission operation. If FB transmission is inhibited by the FB inhibition setting process, the release operation cannot be executed (see FIG. 4, FIG. 6, and S20 in FIG. 7). Therefore, facsimile data corresponding to the original 19 mislaid on the platen 11a or a blank page can be more favorably prevented from being erroneously transmitted.

Other Exemplary Embodiments

While the present invention has been shown and described with reference to certain exemplary embodiments thereof, it will be understood by those skilled in the art that various changes in form and details may be made therein without departing from the spirit and scope of the invention as defined by the appended claims.

Figure 9:
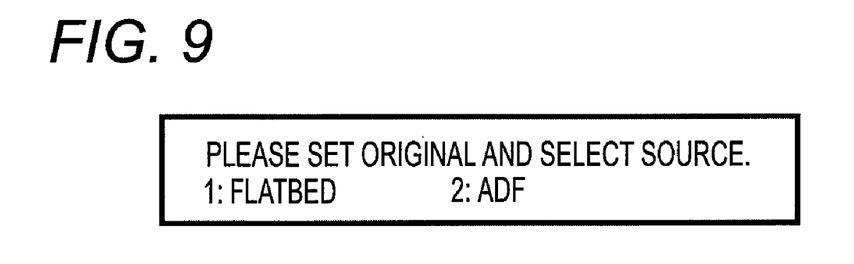
FIG. 9 is an explanatory view showing another display example.

For example, at operations S21 and S22, instead of causing the user to select one of "YES" and "NO" shown in FIG. 8C, as shown in FIG. 9, it may be configured to cause the user to select one of the flatbed (the platen 11a) or the ADF (the automatic document feeding device 20) as a mechanism for reading the image of the original 19.

When the inhibition of FB transmission is released by the operation of S22 or the like, a password may be requested and only when the adequate password is input, the release operation may be executed. In the foregoing exemplary embodiment, the confirmation (S22) on whether to perform FB transmission is executed before the image of the original 19 placed on the platen 11a is read. Alternatively, after the image is read, a message "Image is read from flatbed, but do you want to transmit image?" may be displayed so that the user can perform the confirmation. The present invention is not limited to the multi-function machine, and may be applied to a facsimile machine without copy or scanner function.

What is claimed is:

1. A facsimile machine comprising:
   a first reading unit configured to read an image of an original placed on a platen;
   a conveyance unit configured to convey an original placed on a placing portion;
   a detection sensor configured to detect whether the original is placed on the placing portion;
   a second reading unit configured to read an image of an original being conveyed by the conveyance unit;
   a notifying unit configured to output a notification;
   a mode setting unit configured to set an operation mode from among a plurality of operation modes including an inhibiting mode and a permitting mode;
   a transmitting unit configured to execute a first transmission operation to transmit the image of the original read by the first reading unit as facsimile data and a second transmission operation to transmit the image of the original read by the second reading unit as facsimile data; and
   a controller which, in response to an input of a start signal, is configured to
      control the transmitting unit to execute the second transmission operation if the detection sensor detects that the original is placed on the placing portion and one of the inhibiting mode and the permitting mode is set;
      if the detection sensor detects that the original is not placed on the placing portion and the inhibiting mode is set, control the transmitting unit to inhibit the first transmission operation and the second transmission operation and control the notifying unit to output a notification prompting a user to place an original on the placing portion, and
      if the detection sensor detects that the original is not placed on the placing portion and the permitting mode is set, control the notifying unit to output a notification prompting selection of one of the first transmission operation and the second transmitting operation for the transmitting unit to execute, and control the transmitting unit to execute the first transmission operation in response to selection of the first transmission operation.

2. The facsimile machine according to claim 1, further comprising:
   a temporal mode setting unit configured to temporally change the operation mode from the inhibiting mode to the permitting mode for each transmission operation.

3. A facsimile machine comprising:
   a first reading unit configured to read an image of an original placed on a platen;
   a conveyance unit configured to convey an original placed on a placing portion;
   a detection sensor configured to detect whether the original is placed on the placing portion;
   a second reading unit configured to read an image of an original being conveyed by the conveyance unit;
   a display configured to output a notification;
   a mode setting unit configured to set an operation mode from among a plurality of operation modes including an inhibiting mode and a permitting mode;
   a transmitting unit configured to execute a first transmission operation to transmit the image of the original read by the first reading unit as facsimile data and a second transmission operation to transmit the image of the original read by the second reading unit as facsimile data; and
   a processor;

a memory storing computer executable instructions that, when executed by the processor, perform the steps of:
receiving an input of a start signal, and
in response to receiving the start signal,
    controlling the transmitting unit to execute the second transmission operation in a case that the detection sensor detects that the original is placed on the placing portion;
    controlling the transmitting unit to inhibit the first transmission operation and the second transmission operation and controlling the display to output a notification prompting a user to place an original on the placing portion in a case that the detection sensor detects that the original is not placed on the placing portion and the inhibiting mode is set, and
    controlling the display to output a notification prompting selection of one of the first transmission operation and the second transmitting operation for the transmitting unit to execute and controlling the transmitting unit to execute the first transmission operation in response to selection of the first transmission operation in the case that the detection sensor detects that the original is not placed on the placing portion and the permitting mode is set.

4. The facsimile machine according to claim 3, wherein the memory has computer executable instructions that, when executed, further perform the step of:
    temporally changing the operation mode from the inhibiting mode to the permitting mode for each transmission operation.

\* \* \* \* \*